United States Patent [19]

Chasar

[11] Patent Number: 4,866,138
[45] Date of Patent: Sep. 12, 1989

[54] VULCANIZATION ACCELERATORS

[75] Inventor: Dwight W. Chasar, Northfield, Ohio

[73] Assignee: The B. F. Goodrich Company, Akron, Ohio

[21] Appl. No.: 168,206

[22] Filed: Mar. 15, 1988

Related U.S. Application Data

[63] Continuation-in-part of Ser. No. 75,803, Jul. 20, 1987, abandoned.

[51] Int. Cl.$^4$ .............................. C08F 36/04; C08F 8/34
[52] U.S. Cl. ................................ 525/330.9; 525/331.8; 525/332.6; 525/348; 525/349
[58] Field of Search ....................... 525/348, 349, 330.4, 525/330.9, 331.8, 332.6

[56] References Cited

U.S. PATENT DOCUMENTS

| | | |
|---|---|---|
| 2,381,392 | 8/1945 | Smith et al. . |
| 2,388,236 | 11/1945 | Cooper . |
| 2,495,085 | 1/1950 | Alliger . |
| 3,417,086 | 12/1968 | Smith et al. . |
| 3,546,185 | 12/1970 | Coran ................................ 525/349 |
| 3,875,124 | 4/1975 | Wilder . |
| 3,985,743 | 10/1976 | Taylor . |
| 4,119,588 | 9/1976 | Carpino . |

FOREIGN PATENT DOCUMENTS 880912 10/1961 United Kingdom .

OTHER PUBLICATIONS

Elastomers, Jun. 1978, pp. 36–42, "OTOS/MBT Derivative Vulcanization System", Moore.

Primary Examiner—Christopher Henderson
Attorney, Agent, or Firm—Debra L. Pawl; J. Hughes-Powell

[57] ABSTRACT

A method for, and compositions, providing vulcanizable compounds of unsaturated polymers having an improved balance of scorch time and cure rates, ie., slow scorch times and fast cure rates, comprising adding to said vulcanizable polymers accelerating amounts of benzothiazolesulfenamides selected from the group consisting of N-oxydiethylene-2-benzothiazole sulfenamide, N-t-butyl-2-benzothiazole sulfenamide and N-cyclohexyl-2-benzothiazole sulfenamide, with N-oxydiethylenethiocarbamyl-N'-t-alkyl sulfenamides wherein the alkyl radicals contain 4 to 8 carbon atoms.

20 Claims, No Drawings

VULCANIZATION ACCELERATORS

This is a continuation-in-part of part copending application Ser. No. 075,803, filed on July 20, 1987, now abandoned.

BACKGROUND OF INVENTION

N-oxydiethylene-2-benzothiazole sulfenamide (OBTS), N-t-butyl-2-benzothiazole sulfenamide (BBTS), and N-cyclohexyl-2-benzothiazole sulfenamide (CTBS) are commercially available and widely used accelerators for the curing and vulcanization of unsaturated elastomers. While the scorch time of compounds containing OBTS, BBTS and CTBS are generally satisfactory, the cure rates often are slower than is desireable for many applications. An auxiliary material to be used in conjunction with the N-oxydiethylene-2-benzothiazole sulfenamide, N-t-butyl-2-benzothiazole sulfenamide, and N-cyclohexyl-2-benzothiazole sulfenamide in unsaturated polymers to enhance the cur rate without substantially altering the scorch time would be a valuable addition to the compounders art. Such a system would enhance and expand the use of the N-oxydiethylene-2-benzothiazole sulfenamide, N-t-butyl-2-benzothiazole sulfenamide and N-cyclohexyl-2-benzothiazole sulfenamide while providing the compounder with more flexibility.

SUMMARY OF THE INVENTION

The cojoint use of (1) N-oxydiethylene-2-benzothiazole sulfnamide, (2) N-t-butyl-2-benzothiazole sulfenamide or (3) N-cyclohexyl-2-benzothiazole sulfenamide and N-oxydiethylenethiocarbamyl-N'-t-alkyl sulfenamides, wherein the tertiary alkyl radicals contain 4 to 8 carbon atoms, provides an improved balance of scorch times and cure rates in unsaturated polymer compounds when they are subsequently cured or vulcanized.

DETAILED DESCRIPTION

The N-oxydiethylenethiocarbamyl-N'-t-alkyl sulfenamides have the structural formula

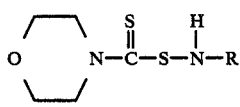

wherein R is a t-alkyl radical containing 4 to 8 carbon atoms, i.e., t-butyl, t-pentyl, 2-methyl-2-pentyl, t-octyl, 2,4,4-trimethyl-2-pentyl, and the like.

The N-oxydiethylenethiocarbamyl-N'-t-alkyl sulfenamides are readily prepared in accordance with procedures described in U.S. Patent No. 3,985,743, Taylor, 1976. A useful procedure is to react morpholine and a t-alkylamine in a solvent with aqueous sodium hypochlorite, and then with carbon disulfide. The resulting sulfenamide is recovered from the reaction media. Preferably the reactions are conducted in an aqueous/non-aqueous medium. The medium comprises water and an organic solvent, usually a chlorinated solvent, including for example methylene chloride, ethylene dichloride, chloroform, carbon tetrachloride and the like. The temperature of reactions range from about, preferably, −10° C. to about 40° C. While an excess of amine may be used, excellent yields are obtained from about 1 mole of morpholine, 1 mole of t-alkyl amine, 1 mole of NaOCl, and 1 mole of carbon disulfide.

The invention is useful is preparing curable and vulcanizable compounds of unsaturated polymers, especially the unsaturated elastomers, and other polymers that may be cured or vulcanized to an elastomeric state. Typical polymers include natural rubber; cispolyisoprene; cis-polybutadiene; copolymers of butadiene-1,3 and vinylidene monomers containing the $CH_2C=$ene-1,3 structure, such as styrene, acrylonitrile, alkyl acrylates and methacrylates, and others known to those skilled in the art; polychloroprene; copolymers of isobutylene and isoprene; unsaturated olefin polymers exemplified by ethylene-propylene diene copolymers, and the like known to those skilled in the art, in both solid, latex and liquid states. The vulcanizable polymers contain at least about one weight percent unsaturation and are usually cured or vulcanized with sulfur and/or sulfur containing compounds.

In addition to the cojoint use of N-oxydiethylene-2-benzothiazole sulfenamide, N-t-butyl-2-benzothiazole sulfenamide or N-cyclohexyl-2-benzothiazole sulfenamide and N-oxydiethylenethiocarbamyl-N'-t-alkyl sulfenamide, in accordance with this invention, the usual compounding agents will be used by the man skilled in the compounding art, depending on the polymer used, the application and the physical properties desired in the cured or vulcanized products. Such materials may include activators, retarders, vulcanizing and curing agents; protective materials including antioxidants, antiozonants, anti-blocking agents, antiflex cracking agents, flame retarders, fungicides, germicides, antistatic agents and chemical and heat stabilizers; processing materials including plasticizers and softeners, processing aids, and tackifiers; extenders, fillers and reinforcing materials, and the like. Standard comcompounding ingredients include zinc oxide, carbon black, sulfur, oil, and fatty acids.

The amounts and ratios of the synergistic combination of N-oxydiethylene-2-benzothiazole sulfenamide, N-t-butyl-2-benzothiazole sulfenamide or N-cyclohexyl-2-benzothiazole sulfenamide with N-oxydiethylenethiocarbamyl-N'-t-alkyl sulfenamide used may be varied by the man skilled in the art depending on the scorch time and cure rate or cure index desired. The amounts normally will be varied from about 0.5 to about 5 weight parts, per one hundred weight parts of polymer used, of N-oxydiethylene-2-benzothiazole sulfenamide, N-t-butyl-2-benzothiazole sulfenamide or N-cyclohexyl-2-benzothiazole sulfenamide and about 0.5 to about 10 weight parts of N-oxydiethylenethiocarbamyl-N'-t-alkyl sulfenamide. The weight ratio of N-oxydiethylene-2-benzothiazole sulfenamide, N-t-butyl-2-benzothiazole sulfenamide or N-cyclohexyl2-benzothiazole sulfenamide to N-oxydiethylenethiocarbamyl-N'-t-alkyl sulfenamide may be from about 0.25 to about 2.

In evaluating the utility of the system of this invention is the following Examples it is assumed that the physical properties of the vulcanizates are about equivalent. Then the scorch and cure rates are considered. These are determined in accordance with ASTM Test Procedure D 1646. This test provides the Mooney scorch delay, $t_5$, and the cure index. In the case of the scorch, longer periods of time, larger numbers, are desirable for flexibility in operations. As to cure index, the smaller number represents a faster cure and is more desirable. In other words, the best condition is to have a compound with a long scorch time and a small cure index.

Another benchmark is the cure rate index, determined in the Monsanto Rheometer, ASTM D 2085. In the rubber industry it is generally accepted that as the cure rate index for a compound becomes larger, indicating a faster cure, the scorch time, $t_2$ or $t_5$ becomes less, a shorter time or smaller number, and thus the compounds are more scorchy and less desirable.

Contrary to this and in accordance with this invention, compounds may be provided that have increased scorch times but are faster curing, as will be shown in the Examples. The structure of the N-oxydiethylenethiocarbamyl-N'-t-alkyl sulfenamide is critical and essential to the successful practice of the invention and many closely related structures do not provide the same balance of desired cured or vulcanizing properties.

In the following Examples, in testing the various sulfenamides, the levels used are based upon an equal molar basis. Examples 1-5 demonstrate the advantages of the invention. Example 6 shows that other sulfenamides, even with similar structures, do not provide the scorch times and cure indexes provided by the N-oxydiethylenethiocarbamyl-N'-t-alkyl sulfenamides. An advantage of use of the N-oxydiethylenethiocarbamyl-N'-t-alkyl sulfenamide is that less can be used to obtain the desired effect than that required for other materials. These N-oxydiethylenethiocarbamyl-N'-t-alkyl sulfenamides are more easily dispersed in elastomers and are very soluble in elastomers such as natural rubber, increasing the ease of incorporation, as well as preventing blooming of stocks. Further, the lower temperature of melting of these materials allows for desirable higher speed processing of compounds.

EXAMPLE 1

N-oxydiethylenethiocarbamyl-N'-t-butyl sulfenamide

To a reactor, equipped with a stirrer and cooling bath, containing 87.12 grams (1.0 mole) of morpholine and 73.14 grams (1.0 mole) of t-butylamine in 1000 ml of methylene chloride, there was added 591.3 grams of a 12.59% aqueous solution (1.0 mole) of sodium hypochlorite, with stirring, at a temperature of 0°-10° C. After ten minutes at this temperature, the mixture was allowed to warm up to 20° C. by removing the cooling bath. At this point 76.14 grams (1.0 mole) of carbon disulfide was added at a rate to maintain the solution at a temperature of 32°-35° C. After the addition was completed, the reaction mixture was stirred for an additional 15 minutes. Agitation was stopped and the reaction mixture allowed to separate into aqueous and organic phases. The phases were separated. Th organic phase was washed with water, and dried with sodium sulfate. The dried solution was heated to evaporate the solvent. A light yellow solid was obtained. This solid was slurried in 200-300 ml of hexane, filtered, rinsed with cold hexane and dried. 165 grams of N-oxydiethylenethiocarbamyl-N'-t-butyl sulfenamide was obtained. The melting point was 66-69° C. The field desorption/mass spectrum indicated a molecular mass of 234.

EXAMPLE 2

To demonstrate the utility of the sulfenamide of Example 1 in combination with N-oxydiethylene-2-benzothiazole sulfenamide (OBTS), and in comparison to N-oxydiethylenethiocarbamyl-N'-oxydiethylene sulfenamide (CR−18), in natural rubber, a series of compounds were prepared following this general recipe:

| Component | Weight parts |
|---|---|
| Natural rubber | 100.0 |
| Zinc oxide | 4.5 |
| Stearic acid | 2.0 |
| Carbon black (HAF) | 50.0 |
| Paraffin wax[1] | 1.0 |
| Aromatic petroleum oil[2] | 10.0 |
| Sulfur | 2.0 |
| N—1,3-dimethylbutyl-N'—phenyl-p-phenylenediamine[3] | 1.5 |

[1]Sunolite 240
[2]Sundex 790
[3]Antozite 67F

Seven compounds were prepared using varying amounts of the sulfenamide of Example 1, N-oxydiethylenethiocarbamyl-N'-t-butyl sulfenamide (BTOS), N-oxydiethylene-2-benzothiazole sulfenamide (OTBS) and N-oxydiethylenethiocarbamyl-N'-oxydiethylene sulfenamide and tested as shown in Table I. The Monsanto Rheometer data were obtained in accordance with ASTM Test Procedure D 2084, the Mooney scorch data were obtained in accordance with ASTM test procedure D 1646, and the Stress Strain data were obtained in accordance with ASTM test procedure D 412. These data clearly demonstrate the unexpected improvement in the balance of scorch and cure rates obtained in natural rubber when the novel combination of sulfenamides is employed.

TABLE I

| Compound | 1 | 2 | 3 | 4 | 5 | 6 | 7 |
|---|---|---|---|---|---|---|---|
| OBTS - weight parts | 0.8 | | | 0.2 | 0.2 | 0.2 | 0.24 |
| CR-18 - weight parts | | 0.6 | | 0.4 | | | |
| BTOS - weight parts | | | 0.6 | | 0.4 | 0.38 | 0.36 |
| Monsanto Rheometer, 1° ARC, 302° F. | | | | | | | |
| Maximum torque, in lbs. | 30.4 | 28.4 | 28.4 | 31.2 | 31.5 | 31.1 | 34.0 |
| Minimum torque, in lbs. | 5.6 | 5.7 | 5.7 | 6.2 | 6.3 | 6.4 | 6.4 |
| $M_H$-$M_L$ | 24.8 | 22.7 | 22.7 | 25.0 | 25.2 | 24.7 | 27.6 |
| Scorch time ($t_2$), min. | 5.7 | 4.8 | 4.6 | 5.4 | 4.8 | 5.0 | 4.9 |
| Cure time ($t_{90}$), min. | 12.8 | 12.1 | 10.5 | 10.7 | 9.2 | 9.4 | 8.8 |
| Cure time ($t_{95}$), min. | 14.5 | 13.3 | 11.7 | 11.5 | 10.0 | 10.2 | 9.6 |
| Cure rate index | 14.1 | 13.7 | 16.9 | 18.9 | 22.7 | 22.7 | 25.6 |
| Mooney Scorch, ML at 250° F. | | | | | | | |
| $t_5$ (min.) | 37.4 | 28.3 | 25.3 | 32.9 | 33.7 | 30.6 | 33.0 |
| $t_{35}$ (min.) | 42.2 | 33.0 | 28.9 | 37.2 | 36.5 | 33.4 | 35.4 |
| Cure Index | 4.8 | 4.7 | 3.6 | 4.3 | 2.8 | 2.8 | 2.4 |
| Stress Strain, Opt.Cure ($t_{95}$) at 302° F. | | | | | | | |
| Tensile strength, psi | 4093 | 4010 | 3793 | 4202 | 4296 | 4145 | 4231 |
| Elongation, % | 591 | 607 | 613 | 598 | 601 | 570 | 615 |

TABLE I-continued

| Compound | 1 | 2 | 3 | 4 | 5 | 6 | 7 |
|---|---|---|---|---|---|---|---|
| 300% Modulus, psi | 1568 | 1500 | 1349 | 1591 | 1650 | 1724 | 1556 |
| Shore A2 hardness | 58.3 | 55.5 | 56.7 | 60.4 | 61.0 | 57.8 | 60.7 |

EXAMPLE 3

To demonstrate the utility of the sulfenamide of Example 1 in combination with N-oxydiethylene-2-benzothiazole sulfenamide (OBTS), and in comparison to N-oxydiethylenethiocarbamyl-N'-oxydiethylene sulfenamide (CR—18), in styrene-butadiene rubber, a series of compounds were prepared following this general recipe:

| Component | Weight parts |
|---|---|
| Ameripol 1712[1] | 55.0 |
| Ameripol 1500[1] | 25.0 |
| Taktene 1203[2] | 35.0 |
| Zinc oxide | 3.0 |
| Stearic acid | 2.0 |
| Carbon black (HAF) | 70.0 |
| Sundex 8125 | 20.0 |
| Antozite 67F | 2.0 |
| Agerite Resin D[3] | 2.0 |
| Sulfur | 2.0 |

[1]Styrene-butadiene rubbers, 22-24% bound styrene
[2]Polybutadiene
[3]Polymerized dihydroquinoline Nine compounds were prepared using varying amounts of the sulfenamide of Example 1, N-oxydiethylenethiocarbamyl-N'-t-butyl sulfenamide (BTOS), N-oxydiethylene-2-benzothiazole sulfenamide (OBTS) and N-oxyethylenethiocarbamyl-N'-oxydiethylene sulfenamide (CR—18) and tested as shown in Table II. The Monsanto Rheometer data were obtained in accordance with ASTM Test Procedure D 2084, the Mooney scorch data were obtained in accordance with ASTM test procedure D 1646, and the Stress Strain data were obtained in accordance with ASTM test procedure D 412. These data show the excellent results obtained using smaller total amounts of the novel combination of sulfenamides, as compared to larger amounts of either sulfenamide used alone.

TABLE II

| Compound | 1 | 2 | 3 |
|---|---|---|---|
| OBTS-weight parts | 1.43 | | 0.43 |
| CR-18-weight parts | | | 0.64 |
| BTOS-weight parts | | 1.01 | |
| Monsanto Rheometer, 1° ARC, 320° F. | | | |
| Maximum torque, in lbs. | 32.5 | 32.0 | 32.7 |
| Minimum torque, in lbs. | 7.0 | 7.0 | 6.7 |
| $M_H-M_L$ | 25.5 | 25.0 | 26.0 |
| Scorch time ($t_2$), min. | 5.5 | 4.3 | 5.5 |
| Cure time ($t_{90}$), min. | 10.04 | 8.8 | 11.3 |
| Cure time ($t_{95}$), min. | 12.1 | 10.0 | 12.7 |
| Cure rate index | 20.4 | 22.5 | 17.2 |
| Mooney Scorch, ML at 280° F. | | | |
| $t_5$ (min.) | 19.0 | 12.8 | 17.2 |
| $t_{35}$ (min.) | 21.4 | 14.9 | 20.4 |
| Cure Index | 2.4 | 2.1 | 3.2 |
| Stress Strain, Opt. Cure ($t_{95}$) at 320° F. | | | |
| Tensile strength, psi | 3067 | 3064 | 3048 |
| Elongation, % | 590 | 535 | 530 |
| 300% Modulus, psi | 1218 | 1476 | 1452 |
| Shore A2 hardness | 63 | 64.8 | 62.9 |
| Compound | 4 | 5 | 6 |
| OBTS-weight parts | 0.43 | 0.40 | 0.43 |
| CR-18-weight parts | | | |
| BTOS-weight parts | 0.64 | 0.60 | 0.60 |
| Monsanto Rheometer, 1° ARC, 320° F. | | | |
| Maximum torque, in lbs. | 32.5 | 32.0 | 32.4 |
| Minimum torque, in lbs. | 7.1 | 7.0 | 7.0 |
| $M_H-M_L$ | 25.4 | 25.0 | 25.4 |
| Scorch time ($t_2$), min. | 5.3 | 5.5 | 5.4 |
| Cure time ($t_{90}$), min. | 9.5 | 9.7 | 8.9 |
| Cure time ($t_{95}$), min. | 10.6 | 10.7 | 10.9 |
| Cure rate index | 23.8 | 23.8 | 28.6 |
| Mooney Scorch, ML at 280° F. | | | |
| $t_5$ (min.) | 18.0 | 19.0 | 18.7 |
| $t_{35}$ (min.) | 20.4 | 21.5 | 21.5 |
| Cure Index | 2.4 | 2.5 | 2.8 |
| Stress Strain, Opt. Cure ($t_{95}$) at 320° F. | | | |
| Tensile strength, psi | 2966 | 3120 | 3015 |
| Elongation, % | 508 | 548 | 518 |
| 300% Modulus, psi | 1484 | 1440 | 1486 |
| Shore A2 hardness | 63.5 | 63.9 | 64.1 |
| Compound | 7 | 8 | 9 |
| OBTS-weight parts | 0.33 | 0.25 | 0.50 |
| CR-18-weight parts | | | |
| BTOS-weight parts | 0.67 | 0.75 | 0.50 |
| Monsanto Rheometer, 1° ARC, 320° F. | | | |
| Maximum torque, in lbs. | 32.5 | 32.5 | 31.5 |
| Minimum torque, in lbs. | 7.4 | 7.5 | 7.2 |
| $M_H-M_L$ | 25.1 | 25.0 | 24.3 |
| Scorch time ($t_2$), min. | 5.3 | 5.0 | 5.7 |
| Cure time ($t_{90}$), min. | 9.6 | 9.2 | 10.6 |
| Cure time ($t_{95}$), min. | 10.6 | 10.2 | 11.7 |
| Cure rate index | 23.3 | 23.8 | 20.4 |
| Mooney Scorch, ML at 280° F. | | | |
| $t_5$ (min.) | 16.0 | 15.9 | 17.2 |
| $t_{35}$ (min.) | 18.4 | 18.4 | 20.1 |
| Cure Index | 2.0 | 2.5 | 2.9 |
| Stress Strain, Opt. Cure ($t_{95}$) at 320° F. | | | |
| Tensile strength, psi | 3053 | 2793 | 2909 |
| Elongation, % | 550 | 485 | 561 |
| 300% Modulus, psi | 1406 | 1499 | 1278 |
| Shore A2 hardness | 66.9 | 67.8 | .68 |

EXAMPLE 4

N-oxydiethylenethiocarbamyl-N'-(2,4,4-trimethyl-2-pentyl) sulfenamide

To a reactor, equipped with a stirrer and cooling bath, containing 8.71 grams (0.1 mole) of morpholine and 12.92 grams (0.1 mole) of t-octylamine in 100 ml of hexane, there was added 55.22 grams of an 13.48% aqueous solution (0.1 mole) of sodium hypochlorite, with stirring, at a temperature of 0°-10° C. After ten minutes at this temperature, the mixture was allowed to warm up to 20° C. by removing the cooling bath. At this point 7.61 grams (0.1 mole) of carbon disulfide was added at a rate to maintain the solution at a temperature of 32°-35° C. After the addition was completed, the reaction mixture was stirred for an additional 15 minutes. Agitation was stopped and a solid precipitate was removed by filtration to give 13 grams of product. This solid was slurried in 200 ml of hexane and filtered to remove the solid impurity. The filtrate was heated to remove the hexane. Ten grams of white, flaky and crystalline N-oxydiethylenethiocarbamyl-N'-(2,4,4-trimethyl-2-pentyl) sulfenamide was obtained. The melting point was 73°-75° C. The field desorption/mass spectrum indicated a molecular mass of 290.

The N-oxydiethylenethiocarbamyl-N'-(2,4,4-trimethyl-2-pentyl)sulfenamide was tested in the same recipe set forth in Example 3 in amount of 1.25 weight parts. The resulting vulcanizate compounds had a Scorch Time, $t_2$, of 5.4 min.; a Cure Time, $t_{90}$, of 10.5 min.; and a Cure Rate Index of 19.6. The Mooney Scorch values obtained were, $t_5$, 15.3 min,; with a Cure Index of 2.4. The tensile strength of the vulcanized compounds was 2901 psi; the percent elongation was 555; and the 300% modulus was 1278 psi.

EXAMPLE 5

N-oxydiethylenethiocarbamyl-N'-t-pentyl sulfenamide

To a reactor, equipped with a stirrer and cooling bath, containing 8.75 grams (0.1 mole) of morpholine and 8.72 grams (0.1 mole) of t-amylamine in 100 ml of hexane, there was added 55.22 grams of an 13.48% aqueous solution (0.1 mole) of sodium hypochlorite, with stirring, at a temperature of 0°–10° C. After ten minutes at this temperature, the mixture was allowed to warm up to 20° C. by removing the cooling bath. At this point 7.61 grams (0.1 mole) of carbon disulfide was added at a rate to maintain the solution at a temperature of 32°–35° C. After the addition was completed, the reaction mixture was stirred for an additional 15 minutes. Agitation was stopped and the reaction mixture allowed to separate into aqueous and organic phases. The phases were separated. The organic phase was washed with water, and dried with sodium sulfate. The dried solution was heated to evaporate the solvent. A yellow oil was obtained which crystallized on standing. This solid was recrystallized from methanol. 8.0 grams of N-oxydiethylenethiocarbamyl-N'-t-pentyl sulfenamide was obtained. The field desorption/mass spectrum indicated a molecular mass of 248.

The N-oxydiethylenethiocarbamyl-N'-t-pentyl sulfenamide was tested in the same recipe set forth in Example 3, in an amount of 1.07 weight parts. The resulting compound had a Scorch Time, $t_2$, of 5.0 min.; a Cure Time, $t_{90}$, of 9.3 min.; and a Cure Rate Index of 23.3. The Mooney Scorch values were, a $t_5$, of 13.0 min, and a Cure Index of 2.2. The tensile strength of vulcanizates of the compound was 2817 psi; elongation of 539% and a 300% modulus of 1301 psi.

EXAMPLE 6

Following the procedure and recipes of Example 3, N-oxybis(2-methylethylene)-thiocarbamyl-N'-t-butyl sulfenamide (2), structurally related to N-oxydiethylenethiocarbamyl-N'-t-alkyl sulfenamides, but not a part of this invention, was compared to N-oxydiethylenethiocarbamyl-N'-t-butyl sulfenamide (1). The amounts used and the results obtained are set forth in Table IV. The sulfenamides of the compounds are identified by the numbers above.

TABLE III

| Compound | 1 | 2 |
| --- | --- | --- |
| Compound (1)-weight parts | 1.01 | |
| Compound (2)-weight parts | | 1.13 |
| Monsanto Rheometer, 1° ARC, 320° F. | | |
| Maximum torque, in lbs. | 32.0 | 27.8 |
| Minimum torque, in lbs. | 6.9 | 7.2 |
| $M_H$-$M_L$ | 25.1 | 20.6 |
| Scorch time ($t_2$), min. | 5.3 | 5.7 |
| Cure time ($t_{90}$), min. | 9.9 | 14.6 |
| Cure time ($t_{95}$), min. | 11.0 | 16.6 |
| Cure rate index | 21.7 | 11.2 |
| Mooney Scorch, ML at 280° F. | | |

TABLE III-continued

| Compound | 1 | 2 |
| --- | --- | --- |
| $t_5$ (min.) | 15.9 | 16.3 |
| $t_{35}$ (min.) | 18.5 | 20.5 |
| Cure Index | 2.6 | 4.2 |
| Stress Strain, Opt. Cure ($t_{95}$) at 320° F. | | |
| Tensile strength, psi | 2939 | 3142 |
| Elongation, % | 470 | 619 |
| 300% Modulus, psi | 1653 | 1186 |
| Shore A2 hardness | 70 | 67 |

Referring to Data Table III, Mooney Scorch Data, the Scorch time ($t_5$) of the two compounds is substantially equivalent, the Scorch time ($t_5$) of (2) being only about 2.5% longer than (1). However, the real and critical difference is in the Cure Index. The Cure Index of (1) is 2.6, about 61.5% lesser, or faster, than (2) having a Cure Index of 4.2.

EXAMPLE 7

To demonstrate the utility of the sulfenamide of Example 1 in combination with N-t-butyl-2-benzothiazole sulfenamide (BBTS) and N-cyclohexyl-2-benzothiazole sulfenamide (CTBS) in styrene-butadiene rubber, a series of compounds were prepared following this general recipe:

| Component | Weight parts |
| --- | --- |
| Ameripol 1712[1] | 55.0 |
| Ameripol 1500 | 25.0 |
| Taktene 1203[2] | 35.0 |
| Zinc oxide | 3.0 |
| Stearic acid | 2.0 |
| Carbon black (HAF) | 70.0 |
| Sundex 8125 | 20.0 |
| Antozite 67F | 2.0 |
| Agerite Resin D[3] | 2.0 |
| Sulfur | 2.0 |

[1]Styrene-butadiene rubbers, 22–24% bound styrene
[2]Polybutadiene
[3]Polymerized dihydroquinoline Five compounds were prepared using the sulfenamide of Example 1, N-oxydiethylenethiocarbamyl-N'-t-butyl sulfenamide (BTOS), with (1) N-t-butyl-2-benzothiazole sulfenamide (BBTS) and (2) N-cyclohexyl-2-benzothiazole sulfenamide (CTBS), and tested as shown in Table IV. The Monsanto Rheometer data were obtained in accordance with ASTM Test Procedure D 2084, the Mooney scorch data were obtained in accordance with ASTM test procedure D 1646, and the Stress Strain data were obtained in accordance with ASTM test procedure D 412. These data show the excellent results obtained using the novel combination of sulfenamide (BTOS) and these two benzothiazole sulfenamides. The Mooney Scorch times ($t_5$) are longer for the combination of N-oxydiethylenethiocarbamyl-N'-t-butyl sulfenamide with N-t-butyl-2-benzothiazole sulfenamide (BBTS) or N-cyclohexyl-2-benzothiazole sulfenamide (CTBS) than that obtained with the equivalent amount of BBTS or CTBS alone. Also the cure rates of the combinations are obviously faster than BBTS or CTBS alone. Thus, by means of the novel combinations of this invention, a desired increase in scorch delay is obtained with no loss, and often, a gain in cure rate. This is not true of the combination of N-oxydiethylenethiocarbamyl-N'-t-butyl sulfenamide with other commercially available benzothiazole accelerators. These commercially available accelerators include: N-dicyclohexyl-2-benzothiazole-sulfenamide (DCBS), N-diisopropyl-2-benzothizazolesulfenamide (DIBS), 2-mercaptobenzothiazole (MBT), 2-benzothiazyl disulfide (MBTS) or 4-morpholino-2-benzothiazyl disulfide (Morfax). This is demonstrated in the following Example 8.

TABLE IV

| Compound | 1 | 2 | 3 | 4 | 5 |
|---|---|---|---|---|---|
| BBTS - weight parts | | 1.35 | | 0.40 | 0.45 |
| CTBS - weight parts | | | 1.50 | | |
| BTOS - weight parts | 1.01 | | | 0.61 | 0.61 |
| Monsanto Rheometer, 1° ARC, 320° F. | | | | | |
| Maximum torque, in lbs. | 31.2 | 32.3 | 31.5 | 32.0 | 32.1 |
| Minimun torque, in lbs. | 7.8 | 7.6 | 7.1 | 8.1 | 8.3 |
| $M_H-M_L$ | 23.4 | 24.7 | 24.4 | 23.9 | 23.8 |
| Scorch time ($t_2$), min. | 5.3 | 5.6 | 5.7 | 6.6 | 6.4 |
| Cure time ($t_{90}$), min. | 10.1 | 12.1 | 10.8 | 11.4 | 10.6 |
| Cure time ($t_{95}$), min. | 11.2 | 13.7 | 12.3 | 12.6 | 11.7 |
| Cure rate index | 18.6 | 13.9 | 16.9 | 18.7 | 20.6 |
| Mooney Scorch, ML at 280° F. | | | | | |
| $t_5$ (min.) | 16.9 | 19.0 | 17.8 | 22.5 | 21.0 |
| $t_{35}$ (min.) | 19.2 | 22.1 | 19.2 | 24.8 | 23.0 |
| Cure Index | 2.3 | 3.1 | 2.0 | 2.3 | 2.0 |
| Stress Strain, Opt. Cure ($t_{95}$) at 320° F. | | | | | |
| Tensile strength, psi | 2954 | 2749 | 2999 | 2821 | 2766 |
| Elongation, % | 581 | 548 | 583 | 559 | 555 |
| 300% Modulus, psi | 1218 | 1217 | 1243 | 1209 | 1205 |

EXAMPLE 8

The procedure from Example 7 was followed, including using the same base recipe and five commercial sulfenamide accelerators. The test results are found in Table V.

After an evaluation of the data it is really apparent that the improved balance of scorch times and cure rates obtained with the N-oxydiethylenethiocarbamyl-N'-alkyl sulfenamides of this invention in combination with N-oxydiethylene-2-benzothiazole sulfenamide, N-t-butyl-2-benzothiazole sulfenamide and N-cyclohexyl-2-benzothiazole sulfenamide are not obtained with other closely related benzothiazole accelerators as demonstrated in these tests in this Example. The combination of BTOS with MBTS results in a scorch delay that is about an average of that of the two additives of the combination. BTOS with MBT exhibits a scorch delay shorter than either additive alone. Although some increase in cure index may be noted, there is still not obtained the desired balance of both increased cure rates and scorch delay. This is also the results noted with Morfax, DIBS and DCBS with BTOS. The scorch times are less for the combination than for Morfax, DIBS and DCBS alone, thus no advantage, and although the cure rates have been increased some this still does not provide the desirable balance obtained in accordance with the invention.

TABLE V

| Compound | 1 | 2 | 3 | 4 |
|---|---|---|---|---|
| MBT | | 0.95 | | |
| MBTS | | | 0.95 | |
| Morfax | | | | 1.62 |
| DIBS | | | | |
| DCBS | | | | |
| BTOS-weight parts | 1.01 | | | |
| Monsanto Rheometer, 1° ARC, 320° F. | | | | |
| Maximum torque, in lbs. | 31.2 | 24.8 | 25.8 | 34.0 |
| Minimum torque, in lbs. | 7.8 | 8.2 | 7.9 | 8.3 |
| $M_H-M_L$ | 23.4 | 16.6 | 17.9 | 25.7 |
| Scorch time ($t_2$), min. | 5.3 | 5.9 | 5.1 | 4.3 |
| Cure time ($t_{90}$), min. | 10.1 | 22.0 | 20.8 | 10.5 |
| Cure time ($t_{95}$), min. | 11.2 | 25.3 | 24.4 | 12.3 |
| Cure rate index | 18.6 | 3.8 | 6.0 | 14.8 |
| Mooney Scorch, ML at 280° F. | | | | |
| $t_5$ (min.) | 16.9 | 17.2 | 14.0 | 12.5 |
| $t_{35}$ (min.) | 19.2 | 23.9 | 21.2 | 15.6 |
| Cure Index | 2.3 | 6.7 | 7.2 | 3.1 |
| Stress Strain, Opt. Cure ($t_{95}$) at 320° F. | | | | |
| Tensile strength, psi | 2954 | 2781 | 2715 | 3017 |
| Elongation, % | 581 | 802 | 759 | 557 |
| 300% Modulus, psi | 1218 | 716 | 729 | 1331 |

| Compound | 5 | 6 | 7 | 8 |
|---|---|---|---|---|
| MBT | | | 0.28 | |
| MBTS | | | | 0.30 |
| Morfax | | | | |
| DIBS | 1.52 | | | |
| DCBS | | 1.97 | | |
| BTOS-weight parts | | | 0.61 | 0.61 |
| Monsanto Rheometer, 1° ARC, 320° F. | | | | |
| Maximum torque, in lbs. | 31.1 | 30.9 | 30.7 | 30.4 |
| Minimum torque, in lbs. | 7.6 | 8.3 | 8.2 | 7.4 |
| $M_H-M_L$ | 23.5 | 22.6 | 22.5 | 23.0 |
| Scorch time ($t_2$), min. | 8.4 | 8.9 | 4.0 | 4.7 |
| Cure time ($t_{90}$), min. | 18.9 | 19.1 | 8.2 | 9.0 |
| Cure time ($t_{95}$), min. | 20.6 | 20.9 | 9.5 | 10.4 |
| Cure rate index | 8.1 | 8.2 | 22.3 | 21.0 |
| Mooney Scorch, ML at 280° F. | | | | |
| $t_5$ (min.) | 28.5 | 30.5 | 12.5 | 15.4 |
| $t_{35}$ (min.) | 35.2 | 37.0 | 14.5 | 17.4 |
| Cure Index | 6.7 | 6.5 | 2.0 | 2.0 |
| Stress Strain, Opt. Cure ($t_{95}$) at 320° F. | | | | |
| Tensile strength, psi | 3019 | 3072 | 2769 | 2803 |
| Elongation, % | 612 | 650 | 609 | 604 |
| 300% Modulus, psi | 1151 | 1081 | 1030 | 1056 |

| Compound | 9 | 10 | 11 |
|---|---|---|---|
| MBT | | | |
| MBTS | | | |
| Morfax | 0.48 | | |
| DIBS | | 0.45 | |
| DCBS | | | 0.59 |
| BTOS-weight parts | 0.61 | 0.61 | 0.61 |
| Monsanto Rheometer, 1° ARC, 320° F. | | | |
| Maximum torque, in lbs. | 33.4 | 30.5 | 31.2 |
| Minimum torque, in lbs. | 8.2 | 7.4 | 8.1 |
| $M_H-M_L$ | 25.2 | 23.1 | 23.1 |
| Scorch time ($t_2$), min. | 4.2 | 6.2 | 6.1 |
| Cure time ($t_{90}$), min. | 8.2 | 12.4 | 12.1 |
| Cure time ($t_{95}$), min. | 9.5 | 13.9 | 13.6 |
| Cure rate index | 22.0 | 14.3 | 14.6 |
| Mooney Scorch, ML at 280° F. | | | |
| $t_5$ (min.) | 13.0 | 19.4 | 19.2 |
| $t_{35}$ (min.) | 15.0 | 22.3 | 22.0 |
| Cure Index | 2.0 | 2.9 | 2.8 |
| Stress Strain, Opt. Cure ($t_{95}$) at 320° F. | | | |
| Tensile strength, psi | 2937 | 2946 | 3108 |

TABLE V-continued

| Elongation, % | 552 | 622 | 634 |
| 300% Modulus, psi | 1315 | 1103 | 1161 |

We claim:
1. Vulcanizable compositions of unsaturated polymers, said polymers selected from the group consisting of natural rubber; cis-polyisoprene; cis-polybutadiene; copolymers of butadiene-1,3 and vinylidene monomoners containing the $CH_2CH<$ structure; polychloroprene; copolymers of isobutylene and isoprene; and unsaturated olefin polymers, comprising accelerating amounts of benzothiazolesulfenamides selected from the group consisting of (1) N-oxydiethylene-2-benzothiazole sulfenamide, (2) N-t-butyl-2-benzothiazole sulfenamide, and (3) N-cyclohexyl-2-benzothiazole sulfenamide, with N-oxydiethylenethiocarbamyl-N'-t-alkyl sulfenamides wherein the alkyl radicals contain 4 to 8 carbon atoms.

2. Compositions of claim 1 wherein said polymer is an elastomer containing at least about one weight percent unsaturation.

3. Compositions of claim 2 wherein said polymer is a butadiene polymer.

4. Compositions of claim 3 wherein said polymer is an isoprene polymer.

5. Compositions of claim 3 wherein said N-oxydiethylenethiocarbamyl-N'-t-alkyl sulfenamide is N-oxydietylenethiocarbamyl-N'-t-butyl sulfenamide.

6. Compositions of claim 3 wherein said N-oxydiethylenethiocarbamyl-N'-t-alkyl sulfenamide is N-oxydiethylenethiocarbamyl-N'-t-pentyl sulfenamide.

7. Compositions of claim 3 wherein said N-oxydiethylenethiocarbamyl-N'-t-alkyl sulfenamide is N-oxydiethylenethiocarbamyl-N'-2,4,4-trimethyl-2-pentyl sulfenamide.

8. Compositions of claim 4 wherein said N-oxydiethylenethiocarbamyl-N'-t-alkyl sulfenamide is N-oxydiethylenethiocarbamyl-N'-t-butyl sulfenamide.

9. Compositions of claim 4 wherein said N-oxydiethylenethiocarbamyl-N'-t-alkyl sulfenamide is N-oxydiethylenethiocarbamyl-N'-t-pentyl sulfenamide.

10. Compositions of claim 4 wherein said N-oxydiethylenethiocarbamyl-N'-t-alkyl sulfenamide is N-oxydiethylenethiocarbamyl-N'-2,4,4-trimethyl-2-pentyl sulfenamide.

11. A method for providing vulcanizable compounds of unsaturated polymers having an improved balance of scorch times and cure rates, said polymers selected from the group consisting of natural rubber; cis-polyisoprene; cis-polybutadiene; copolymers of butadiene-1,3 and vinyldiene monomers containing the $CH_2CH<$ structure; polychloroprene; copolymers of isobutylene and isoprene; and unsaturated olefin polymers, comprising adding to said unsaturated polymer accelerating amounts of benzothiazolesulfenamides selected from the group consisting of (1) N-oxydiethylene-2-benzothiazole sulfenamide, (2) N-t-butyl-2-benzothiazole sulfenamide, and (3) N-cyclohexyl-2-benzothiazole sulfenamide, with N-oxydiethylenethiocarbamyl-N'-t-alkyl sulfenamides wherein the alkyl radicals contain 4 to 8 carbon atoms.

12. A method of claim 11 wherein said polymer is an elastomer containing at least about one weight percent unsaturation.

13. A method of claim 12 wherein said unsaturated elastomer is a butadiene polymer.

14. A method of claim 13 wherein the diene polymer is an isoprene polymer.

15. A method of claim 12 wherein the N-oxydiethylenethiocarbamyl-N'-t-alkyl sulfenamide is N-oxydiethylenethiocarbamyl-N'-t-butyl sulfenamide.

16. A method of claim 12 wherein the N-oxydiethylenethiocarbamyl-N'-t-alkyl sulfenamide is N-oxydiethylenethiocarbamyl-N'-t-pentyl sulfenamide.

17. A method of claim 12 wherein the N-oxydiethylenethiocarbamyl-N'-t-alkyl sulfenamide is N-oxydiethylenethiocarbamyl-N'-2,4,4-methyl-2-pentyl sulfenamide.

18. A method of claim 14 wherein the N-oxydiethylenethiocarbamyl-N'-t-alkyl sulfenamide is N-oxydiethylenethiocarbamyl-N'-t-butyl sulfenamide.

19. A method of claim 14 wherein the N-oxydiethylenethiocarbamyl-N'-t-alkyl sulfenamide is N-oxydiethylenethiocarbamyl-N'-t-pentyl sulfenamide.

20. A method of claim 14 wherein the N-oxydiethylenethiocarbamyl-N'-t-alkyl sulfenamide is N-oxydiethylenethiocarbamyl-N'-2,4,4-methyl-2-pentyl sulfenamide.

* * * * *